US009760508B2

(12) United States Patent
Takamura (10) Patent No.: US 9,760,508 B2
(45) Date of Patent: Sep. 12, 2017

(54) CONTROL APPARATUS, COMPUTER SYSTEM, CONTROL METHOD AND STORAGE MEDIUM

(71) Applicant: CANON KABUSHIKI KAISHA, Tokyo (JP)

(72) Inventor: Akihiro Takamura, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 383 days.

(21) Appl. No.: 14/324,933

(22) Filed: Jul. 7, 2014

(65) Prior Publication Data

US 2015/0026375 A1 Jan. 22, 2015

(30) Foreign Application Priority Data

Jul. 17, 2013 (JP) .................. 2013-148828

(51) Int. Cl.
*G06F 13/16* (2006.01)
*G06F 12/00* (2006.01)

(52) U.S. Cl.
CPC .......... *G06F 13/1663* (2013.01); *G06F 12/00* (2013.01); *G06F 13/1668* (2013.01)

(58) Field of Classification Search
CPC ... G06F 13/1663; G06F 13/1668; G06F 12/00
See application file for complete search history.

(56) References Cited

U.S. PATENT DOCUMENTS

| | | | | |
|---|---|---|---|---|
| 6,128,716 A * | 10/2000 | Biggs | .................. | G06F 13/1631 365/203 |
| 6,381,672 B1 * | 4/2002 | Strongin | .............. | G11C 7/1015 365/238.5 |
| 2005/0204094 A1 * | 9/2005 | Rotithor | .............. | G06F 12/0215 711/105 |
| 2011/0055495 A1 * | 3/2011 | Wolford | .............. | G06F 13/1694 711/154 |
| 2012/0317351 A1 | 12/2012 | Nishioka et al. | | |
| 2014/0101381 A1 * | 4/2014 | Svendsen | ............ | G06F 13/1642 711/105 |
| 2014/0115294 A1 * | 4/2014 | Fleischer | ................ | G06F 12/08 711/204 |
| 2014/0164712 A1 | 6/2014 | Takamura | | |

FOREIGN PATENT DOCUMENTS

| | | |
|---|---|---|
| JP | 2000-331476 A | 11/2000 |
| JP | 2004-013618 A | 1/2004 |
| JP | 2006-127110 A | 5/2006 |

OTHER PUBLICATIONS

Japanese Office Action dated Mar. 21, 2017 in Japanese Application No. 2013148828.

* cited by examiner

*Primary Examiner* — Nimesh G Patel
(74) *Attorney, Agent, or Firm* — Fitzpatrick, Cella, Harper & Scinto (57) ABSTRACT

A control apparatus which controls an access to a memory acquires, for the access to the memory, a predetermined address corresponding to the order of addresses at which the memory is accessed, and determines whether the predetermined address is identical to the target address of the access. In a case where the predetermined address is identical to the target address, the control apparatus controls the access to the memory so as to perform page close after the end of the access to the target address.

8 Claims, 5 Drawing Sheets

FIG. 1A

CASE IN WHICH PAGE HIT OCCURS IN SECOND ACCESS

FIG. 1B

CASE IN WHICH PAGE MISS OCCURS IN SECOND ACCESS

CONTROL APPARATUS, COMPUTER SYSTEM, CONTROL METHOD AND STORAGE MEDIUM

BACKGROUND OF THE INVENTION

Field of the Invention

The present invention relates to a memory access technique.

Description of the Related Art

As the degree of integration of semiconductors increases, various processors are integrated in one LSI chip. When integrating various processors in one LSI chip, a configuration in which these processors in the chip share a DRAM connected outside the LSI chip is widely adopted to suppress the cost to be low.

At this time, the order of addresses at which the memory is accessed (access pattern) when the respective processors access the DRAM are sometimes different. Along with this, it is necessary to appropriately perform page close in the page mode of the DRAM so as to shorten the DRAM access time and obtain high performance even when a different access pattern is used.

Recent DRAMs have a page mode capable of shortening the access time. A DRAM is constituted by a plurality of banks, and each bank includes a plurality of pages. The DRAM selects a page to be accessed in accordance with a bank selection signal and ROW address, opens it, and designates a read or write destination address in accordance with designation of the next COLUMN address.

By using the page mode, when the same page in the bank of the DRAM is accessed (when a page hit occurs), the page can be accessed in a short time. However, when another page in the bank of the DRAM is accessed (when a page miss occurs), precharge is performed to close the currently accessed page, then a new ROW address is designated, and the page is opened and accessed.

Figure 1A:
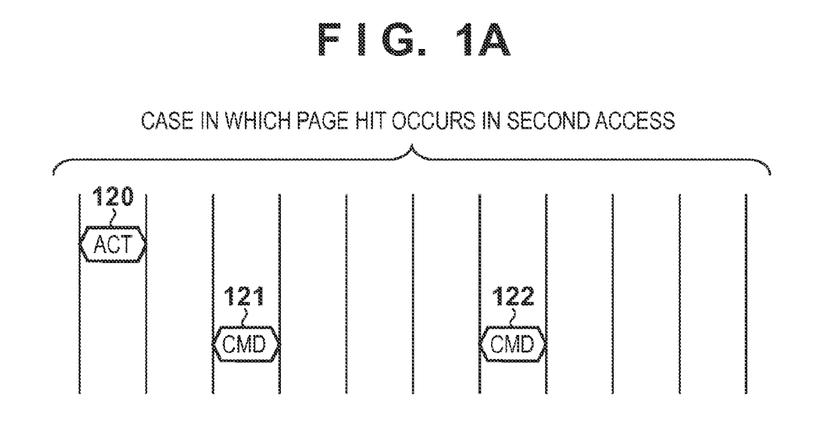
FIGS. 1A and 1B are conceptual views showing DRAM control operations when a page hit occurs and when a page miss occurs.
Figure 1B:
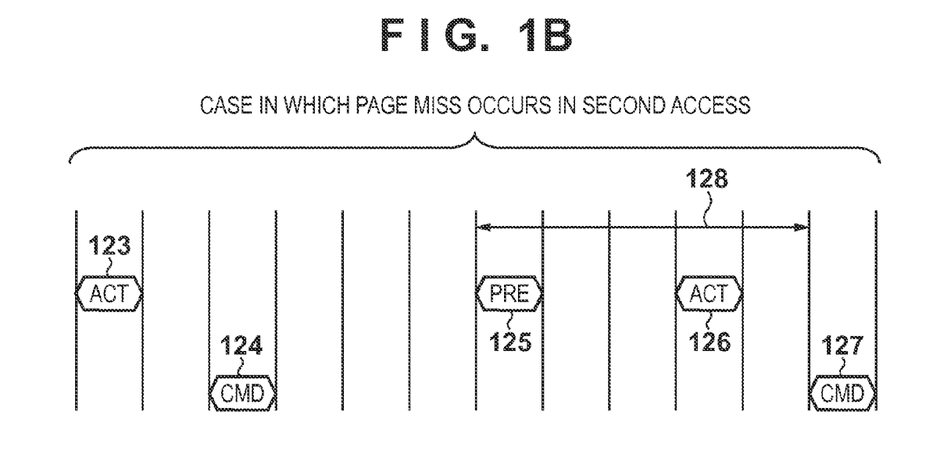

FIGS. 1A and 1B show the procedures of the DRAM access. The DRAM opens a page in accordance with ACT, designates a page in accordance with CMD, makes a write or read access, and closes the page in accordance with PRE.

FIG. 1A shows a case in which the first access and second access target the same bank and the same page, and a page hit occurs in the second access. In this case, a page is opened in accordance with ACT 120, and the first access is made in accordance with CMD 121. After that, CMD 122 is issued, and the second access can be made without closing the page or opening another page.

FIG. 1B shows a case in which the first access and second access target different pages of the same bank, and a page miss occurs in the second access. At this time, first, a page is opened in accordance with ACT 123, and the first access is made in accordance with CMD 124. Then, the page is closed in accordance with PRE 125, a page is opened for the second access in accordance with ACT 126, and the second access is made in accordance with CMD 127. Hence, a page miss penalty 128 is generated by the ACT and PRE.

To improve the memory access speed, it is important to reduce penalties upon page misses by decreasing page misses.

Which of a page hit and miss occurs depends on the memory access pattern (access order) of a processor and the page allocation. For example, in an access pattern in the raster direction shown in FIG. 2, the address increases continuously. In a rectangle order access pattern shown in FIG. 3, the address increases continuously in the X direction, and then increases in the Y direction, so the address increases discontinuously.

In this manner, when a plurality of access patterns are used, page allocation to the bits of a ROW address and COLUMN address is performed so that a page remains unchanged even if the page is increased in either the X direction or Y direction, in order to increase the memory access speed. For example, in FIG. 4, when the page size is 1 KB, as a frame buffer, 16 pixels in the X direction×16 pixels in the Y direction form an identical page, where one pixel is comprised of 32 bits (4 bytes).

Japanese Patent Laid-Open Nos. 2000-331476 and 2006-127110 disclose techniques for controlling issuing of page close in accordance with a memory access pattern. Japanese Patent Laid-Open No. 2000-331476 discloses a technique in which a memory controller detects whether a page subjected to the current memory access and a page subjected to the next memory access are the same in the address queue, thereby performing close at an appropriate timing. Japanese Patent Laid-Open No. 2006-127110 discloses a technique in which when a plurality of bus masters have different orders of addresses to be accessed in a memory, a memory controller can detect the end of a burst access for each bus master. In the technique disclosed in Japanese Patent Laid-Open No. 2006-127110, page close, and open of a page to be referred to in a subsequent memory access are performed at the end of a burst access for each master device.

A plurality of processors existing in a system and having different memory access patterns is becoming popular. In terms of proper control of page close, the memory controller in Japanese Patent Laid-Open No. 2000-331476 cannot perform proper control if the next memory access has not arrived, because this memory controller uses the next memory access for detecting a page change. Further, the technique in Japanese Patent Laid-Open No. 2000-331476 increases the circuit scale for detecting a page change. The memory controller in Japanese Patent Laid-Open No. 2006-127110 performs page close control only at the end of a burst access. Thus, page close control when the page changes during a burst access becomes improper, and the memory access time becomes long.

The present invention has been made to solve the above-described problems, and provides a technique of shortening the memory access time with a simple arrangement.

SUMMARY OF THE INVENTION

According to one aspect of the present invention, there is provided a control apparatus which controls an access to a memory, comprising: an acquisition unit configured to acquire, for the access to the memory, a predetermined address corresponding to an order of addresses at which the memory is accessed; a determination unit configured to determine whether the predetermined address is identical to a target address of the access; and a control unit configured to, in a case where the predetermined address is identical to the target address, control the access to the memory so as to perform page close after an end of the access to the target address.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the embodiment, a predetermined address corresponding to an access pattern to a memory address that is set for each of a plurality of processors is acquired. Then, it is determined whether the predetermined address and the target address of an access are the same. If the predetermined address and the target address are the same, page close is performed after an access to the target address, thereby shortening the memory access time.

Figure 2:
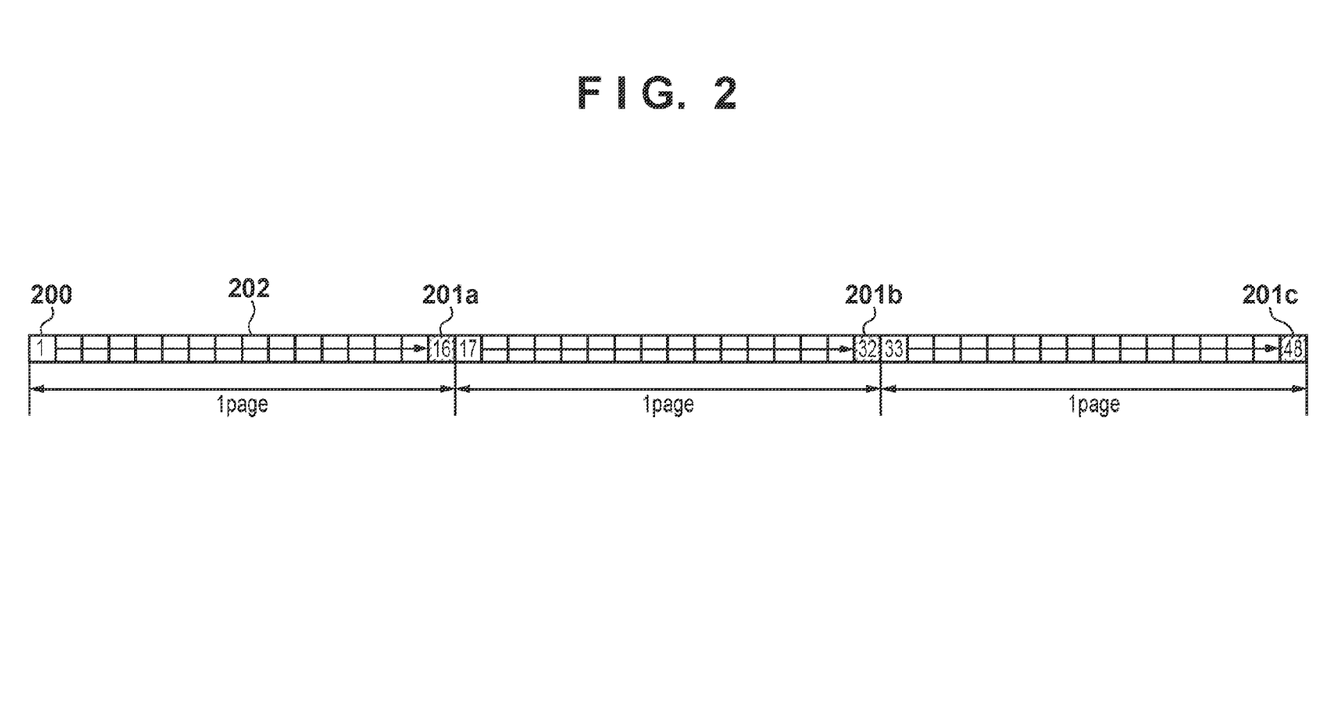
FIG. 2 is a view showing an example of the order of addresses at which a memory is accessed.
Figure 3:
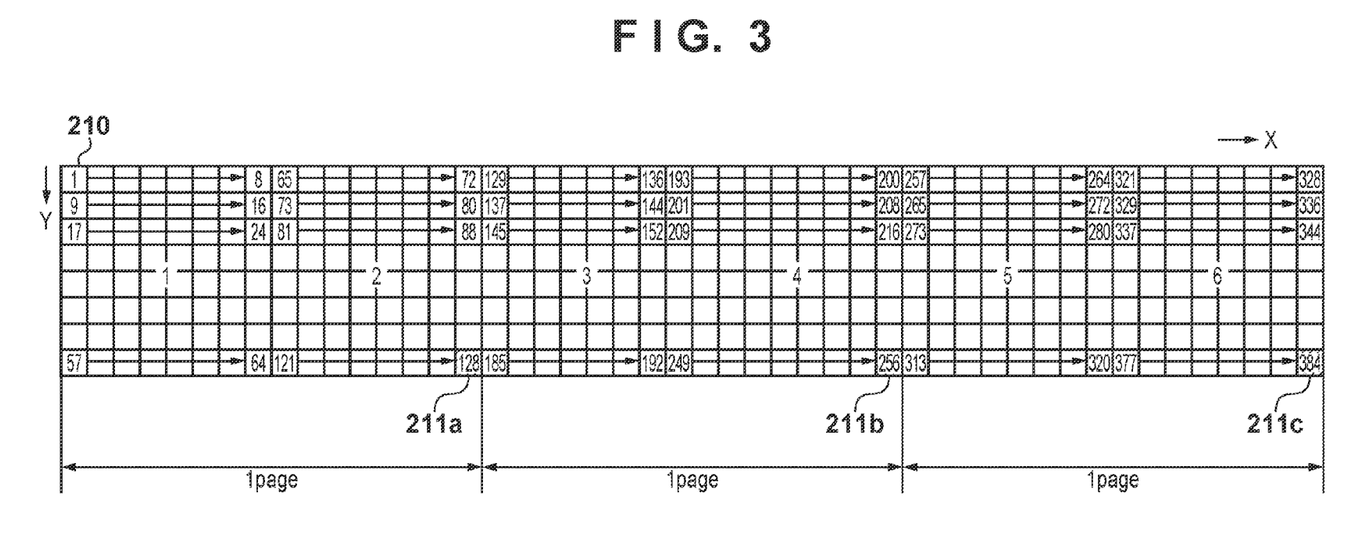
FIG. 3 is a view showing an example of the order of addresses at which a memory is accessed.

Note that the access pattern here includes one shown in FIG. 2 or 3. In the examples of FIGS. 2 and 3, one square includes information about one pixel. For example, in the access pattern of FIG. 2, upon completion of a memory access to one entire row of a memory, a memory access to the next row is made. In the access pattern of FIG. 3, an access is made for each block of 8 pixels×8 pixels. In the example of FIG. 3, upon completion of a memory access to eight pixels of one row in a block, a memory access to eight pixels of the next row is made. After accesses to eight rows are completed by repeating this operation, a memory access to the next (right adjacent) block is made.

Figure 4:
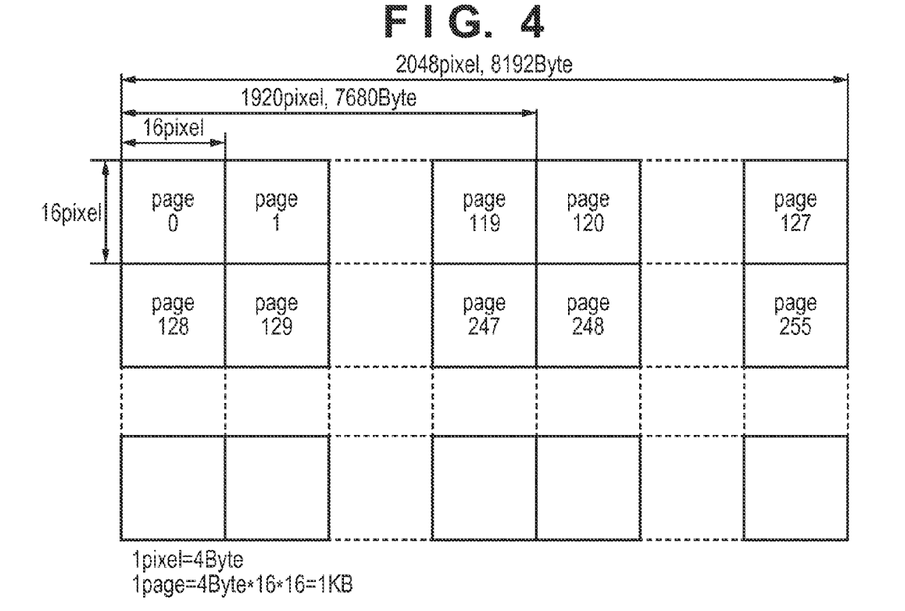
FIG. 4 is a view showing an example of page allocation in a frame buffer.

Assume that the memory is divided into a plurality of pages each having a range of 16 pixels×16 pixels, as shown in FIG. 4. In this case, when the access pattern in FIG. 2 is used, it can be known in advance that page switching occurs in an access to an address present right by 16 pixels after an access to an address at the left end of a page. For example, when an address 201a in FIG. 2 is accessed, page switching occurs in an access to the next address in the access pattern. Therefore, when the address 201a is accessed, page close is performed after the end of the access. This obviates the need to perform page close separately, and a high-speed memory access can be achieved. In the embodiment, when the address 201a, and addresses 201b and 201c are accessed, it is controlled to perform page close after the end of the access.

Similarly, when the access pattern in FIG. 3 is used, there are two blocks in FIG. 3 in the X direction and two blocks in the Y direction for the page configuration in FIG. 4. In the access pattern of FIG. 3, when a memory access to one block ends, a memory access to a right adjacent block is made. After the end of the memory access to the right adjacent block, a memory access to a second right adjacent block is made. When the access pattern in FIG. 3 is used, two blocks are combined into one group, and the page is switched upon completion of a memory access to the final (lower right end) pixel of the right block. That is, when an address 211a in FIG. 3 is accessed, page close is performed after the end of the access, and a high-speed memory access can be performed. In the embodiment, when the address 211a, and addresses 211b and 211c are accessed, it is controlled to perform page close after the end of the access.

That is, in the embodiment, a predetermined address at which page close is performed after the end of an access is set in accordance with which of the access pattern in FIG. 2 and the access pattern in FIG. 3 is used. When the target address of an actual access is the predetermined address at which page close is performed, it is controlled to perform page close after the end of the access.

Even when a plurality of processors exist in a system and have different memory access patterns (orders), page close control can be properly performed with a small circuit scale. As a result, the time taken for page close and page open in a memory access can be shortened. The frequency, bit width, and number of channels of a memory interface can be decreased, reducing the product cost.

Subsequently, the structure and detailed operation of a computer system according to the embodiment will be explained.

Figure 5:
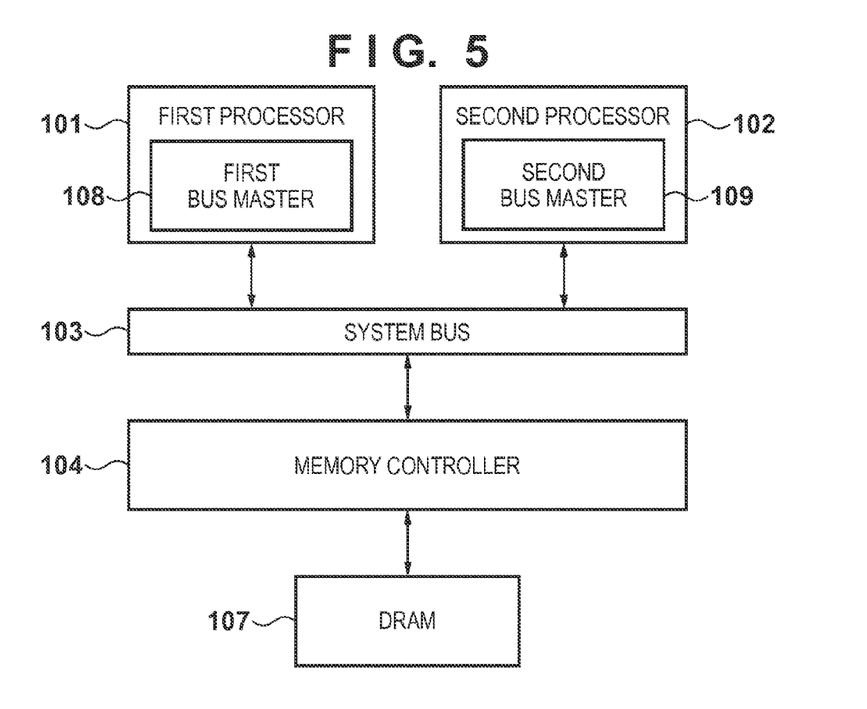
FIG. 5 is a block diagram showing an example of the arrangement of a computer system.

FIG. 5 is a view showing an example of the configuration of the computer system according to the embodiment. Here, an example in which an interface with a DRAM has 32 bits and four 32-bit accesses are performed by one access will be explained. However, the following embodiment is applicable to even another configuration. For simplicity of description, a case in which the bus master ID (identification information) of a bus connecting a bus master and memory controller is used as information for identifying an address at which page close is performed for each access pattern will be explained. Note that information specifying an address at which page close is performed for each access pattern may be notified by a sideband signal between the bus master and the memory controller. Information specifying an access pattern itself may be notified. In this case, an address at which page close is performed may be specified from the access pattern and the range of a page in the memory. For example, when a page including the first address, and a page including the second address which is accessed next to the first address are different in a given access pattern, the first address is set as an address at which page close is performed. Note that an address at which page close is performed may be held as a table for each access pattern.

The computer system in FIG. 5 includes, for example, a first processor 101, second processor 102, system bus 103, memory controller 104, and DRAM 107.

When the first processor 101 makes a memory access, a first bus master 108 outputs, to the system bus 103, a command (Read or Write), a bus master ID, an address, and if the command is Write, data to be written. This also applies to a memory access by the second processor 102. However, since the bus master is different, a second bus master 109 outputs, to the system bus 103, a bus master ID different from that of the first bus master 108.

The system bus 103 performs arbitration, and outputs, to the memory controller 104, a command (Read or Write), a bus master ID, an address, and if the command is Write, data to be written of a memory access which has won the arbitration. When a Read command is received, the system bus 103 sends, to a processor designated by a bus master ID, read data from the DRAM that has been sent by the memory controller 104.

When the memory controller 104 receives a Read command, it reads from an address designated in the DRAM.

The memory controller 104 sends data read out from the DRAM in accordance with the received bus master ID. Further, when the memory controller 104 receives a Write command, it writes to an address designated in the DRAM.

Figure 6:
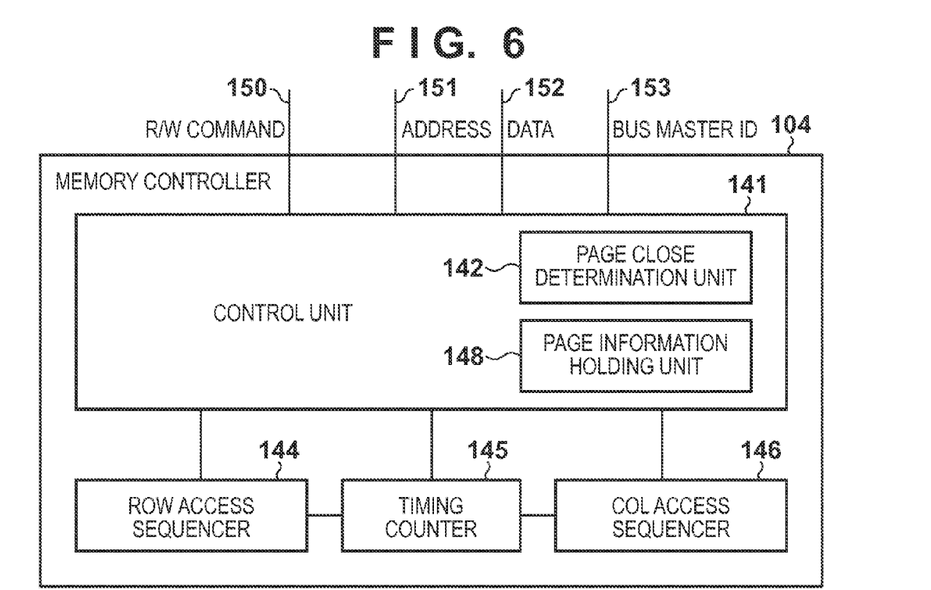
FIG. 6 is a block diagram showing an example of the arrangement of a memory controller.

FIG. 6 is a block diagram showing an example of the arrangement of the memory controller 104. The memory controller 104 includes, for example, a control unit 141, page close determination unit 142, ROW access sequencer 144, timing counter 145, COL access sequencer 146, and page information holding unit 148.

The control unit 141 determines a page hit/page miss, and instructs the ROW access sequencer 144 and COL access sequencer 146 about page open (page activation) or page close (precharge). Also, the control unit 141 performs generation of a command issuing address, refresh, read, write, mode setting, and the like.

The page information holding unit 148 holds, for each bank, information representing which of the open and close states a page takes, and when the page is opened, the page number of the open page. Every time the page is opened or closed, the control unit 141 updates the page information holding unit 148.

The control unit 141 calculates a bank and page from the target address of an access, and refers to the page information holding unit 148. If the calculated bank is opened and the open page is the same as the calculated page, a page hit occurs. At this time, the control unit 141 directly issues a memory access command to the COL access sequencer 146.

If the calculated bank is opened and the open page is different from the calculated page, a page miss occurs. At this time, the control unit 141 issues, to the ROW access sequencer 144, an instruction to close the currently opened page, and then issues an instruction to open a page to be accessed. After that, the control unit 141 issues a memory access command to the COL access sequencer 146.

If the calculated bank is closed, the control unit 141 issues, to the ROW access sequencer 144, an instruction to open a page. After the target page of an access is opened, the control unit 141 issues a memory access command to the COL access sequencer 146.

When the ROW access sequencer 144 receives a page open/close instruction, it refers to the timing counter 145, waits for the timing when a command can be issued, and then issues a page open command or page close command to the DRAM 107. Note that the timing counter 145 is a counter for waiting for the timing not to violate the constraint of the command issuing timing of the DRAM.

When the COL access sequencer 146 receives a memory access command, it refers to the timing counter 145, waits for a timing when a command can be issued, and then issues a read or write command to the DRAM 107. When performing read or write, the COL access sequencer 146 can output an instruction to perform page close after the end of the operation (AutoPageClose). When it is known that a page close command will be issued after the end of an access to the target address of read or write, the AutoPageClose function obviates the need to separately issue a page close command. As a result, the memory access time can be shortened.

Figure 7:
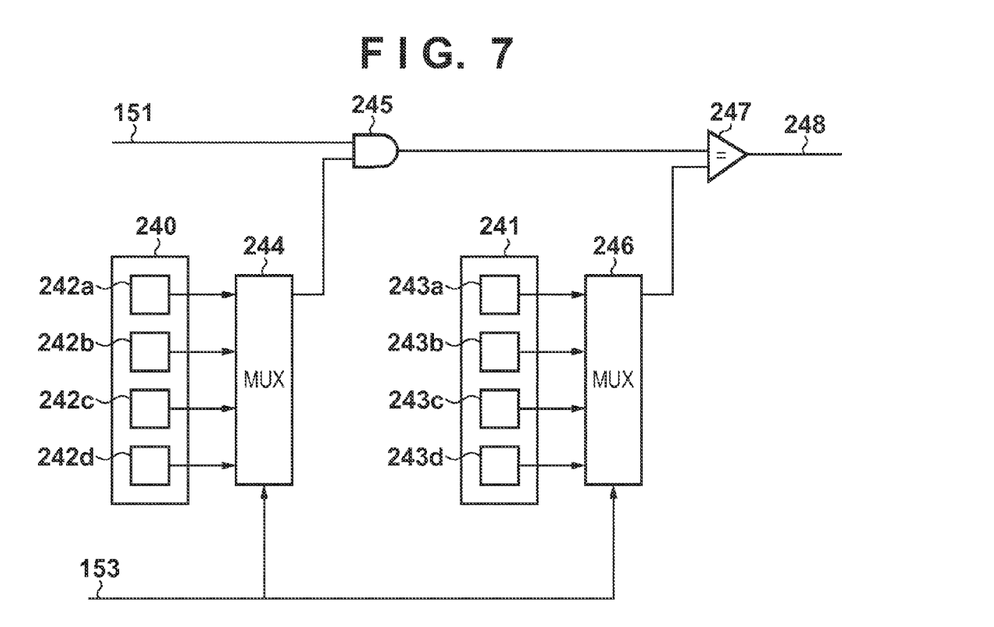
FIG. 7 is a block diagram showing an example of the arrangement of a page close determination unit.

FIG. 7 is a block diagram showing an example of the arrangement of the page close determination unit 142. Based on the target address of a current access, and an address which is set for each bus master ID and at which page close is performed, the page close determination unit 142 determines whether to issue a close command to a page to be accessed. The determination procedures will be explained later.

First, the page close determination unit 142 receives an address 151 and bus master ID 153. Then, a multiplexer 244 outputs a value corresponding to the bus master ID 153 from a PageClose address mask stored in a PageClose address mask register 240. An AND gate 245 ANDs this value and the address 151. Further, a multiplexer 246 outputs a value corresponding to the bus master ID 153 from the compare value of a PageClose address stored in a PageClose address compare register 241. A comparator 247 compares this value with an output from the AND gate 245. If the value and output are equal, a PageClose request 248 is asserted.

When the PageClose request 248 is asserted, and read or write is performed, an AutoPageClose read or write command is sent to the COL access sequencer 146. When the target address of an access is identical to a predetermined address which corresponds to an access pattern and at which page close is performed, the COL access sequencer 146 executes the AutoPageClose function. By deciding, for each access pattern, a proper address at which page close is performed, the memory access time when different access patterns are used can be shortened.

Assume that the respective pixel values of image data are stored from an address of 0x01000000 in a state in which the DRAM page allocation shown in FIG. 4 is set. An example will be explained, in which the first bus master 108 performs pixel write at this address in the raster direction (access pattern as shown in FIG. 2), and the second bus master 109 reads out the written data in the order of 8×8×N (access pattern as shown in FIG. 3).

Since write in the memory is performed with the access pattern in the raster direction as shown in FIG. 2, the first bus master 108 performs AutoPageClose at positions such as 201a, 201b, and 201c in FIG. 2 in response to an access from the first bus master 108. More specifically, when performing read including an address whose lower 6 bits are 111100 (0x3c), AutoPageClose is performed. At this time, 0x0000003c is stored in master ID#1 242b of the PageClose address mask register 240. Further, 0x0000003c is stored in master ID#1 243b of the PageClose address compare register 241.

The second bus master 109 performs read from the memory with the access pattern of 8×8×N as shown in FIG. 3. Hence, AutoPageClose is performed at positions such as 211a, 211b, and 211c in FIG. 3 in response to an access from the second bus master 109. More specifically, when the lower 6 bits of the address are 0x3c and the 15th to 13th bits of the address are 0x7, AutoPageClose is performed. At this time, 0x0000e03c is stored in master ID#3 242d of the PageClose address mask register 240. Further, 0x0000e03c is stored in master ID#3 243d of the PageClose address compare register 241.

When the first bus master 108 writes data of 1,920 pixels with the access pattern in the raster direction, and the target addresses of the write are {0x0100003c, 0x0100007c, 0x010000bc, 0x010000fc, 0x0100013c, 0x0100017c, 0x010001bc, 0x010001fc, . . . , 0x01001d3c, 0x01001d7c, 0x01001dbc, 0x01001dfc}, AutoPageClose is performed after the end of the write.

When the second bus master 109 reads 512 pixels with the access pattern of 8×8×N, and the target addresses of the read are {0x0100e03c, 0x0100e07c, 0x0100e0bc, 0x0100e0fc}, AutoPageClose is performed after the end of the read.

As described above, the memory controller according to the embodiment identifies, from a bus master ID, an address which corresponds to each access pattern and at which page close is performed, and then performs page close in accordance with a read/write address. Even when a plurality of processors exist in a system and have different memory access patterns, page close control can be performed properly. As a result, the memory access time can be shortened. The circuit used to perform page close control need neither make a comparison with a subsequent access address, nor wait for a subsequent address. The circuit scale can be reduced.

The present invention can shorten the memory access time with a simple arrangement.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-148828 filed on Jul. 17, 2013, which is hereby incorporated by reference herein in its entirety.

What is claimed is:

1. A control apparatus which controls an access to a memory, comprising:
   an acquisition unit configured to acquire an address at which page close is performed, the address being determined in accordance with an access pattern according to which a processing apparatus accesses the memory; and
   a control unit configured to control the access to the memory so as to perform the page close after the processing apparatus accesses the address acquired by the acquisition unit,
   wherein, for the access pattern and another access pattern, there is at least one address which is commonly accessed, but shapes of regions accessed according to the respective access patterns or respective orders of addresses in which the memory is accessed according to the respective access patterns are different.

2. The apparatus according to claim 1, the address at which the page close is performed is set based on the access pattern and a configuration of a page in the memory.

3. The apparatus according to claim 1, wherein the address at which the page close is performed is a first address when page switching occurs between the first address and a second address that is an address to be accessed next to the first address according to the access pattern.

4. The apparatus according to claim 1, further comprising a holding unit configured to hold addresses at which the page close is performed according to individual access patterns for each of a plurality of processing apparatuses connected to the control apparatus,
   wherein the acquisition unit identifies the address at which the page close is performed based on identification information of the processing apparatus included in a memory access request acquired from the processing apparatus, and the control unit controls performance of the page close based on the identified address and an access target address included in the memory access request.

5. The apparatus according to claim 1, further comprising a determination unit configured to determine whether or not the address acquired by the acquisition unit corresponds to an access target address included in an access request obtained from the processing apparatus,
   wherein the control unit controls the page close to be performed after the access target address being accessed in a case where the determination unit determines that the address acquired by the acquisition unit corresponds to the access target address.

6. A computer system comprising a memory and a control apparatus which controls an access to the memory, wherein the control apparatus comprises:
   an acquisition unit configured to acquire an address at which page close is performed, the address being determined in accordance with an access pattern according to which a processing apparatus accesses the memory; and
   a control unit configured to control the access to the memory so as to perform the page close after the processing apparatus accesses the address acquired by the acquisition unit,
   wherein, for the access pattern and another access pattern, there is at least one address which is commonly accessed, but the shapes of the regions accessed according to the respective access patterns or respective orders of addresses in which the memory is accessed according to the respective access patterns are different.

7. A control method of a control apparatus which controls an access to a memory, comprising:
   acquiring an address at which page close is performed, the address being determined in accordance with an access pattern according to which a processing apparatus accesses the memory; and
   controlling the access to the memory so as to perform the page close after the processing apparatus accesses the acquired address,
   wherein, for the access pattern and another access pattern, there is at least one address which is commonly accessed, but shapes of regions accessed according to the respective access patterns or respective orders of addresses in which the memory is accessed according to the respective access patterns are different.

8. A non-transitory computer-readable storage medium storing a computer program for causing a computer of a control apparatus which controls an access to a memory, to:
   acquire an address at which page close is performed, the address being determined in accordance with an access pattern according to which a processing apparatus accesses the memory; and control the access to the memory so as to perform the page close after the processing apparatus accesses the acquired address, wherein, for the access pattern and another access pattern, there is at least one address which is commonly accessed, but shapes of regions accessed according to the respective access patterns or respective orders of addresses in which the memory is accessed according to the respective access patterns are different.

* * * * *